United States Patent
Lee et al.

(10) Patent No.: US 9,335,172 B2
(45) Date of Patent: May 10, 2016

(54) APPARATUS FOR MEASURING LOCATION OF UNDERWATER VEHICLE AND METHOD THEREOF

(75) Inventors: Jaeyong Lee, Daejeon (KR); Sanghoon Baek, Gyeonggi-do (KR); Yunkyu Choi, Daejeon (KR); Youngjun Park, Daejeon (KR); Jongho Eun, Daejeon (KR)

(73) Assignee: SAMSUNG HEAVY IND. CO., LTD, Seoul (KR)

( * ) Notice: Subject to any disclaimer, the term of this patent is extended or adjusted under 35 U.S.C. 154(b) by 0 days.

(21) Appl. No.: 14/233,010

(22) PCT Filed: Jul. 13, 2012

(86) PCT No.: PCT/KR2012/005624
§ 371 (c)(1),
(2), (4) Date: Jan. 15, 2014

(87) PCT Pub. No.: WO2013/012218
PCT Pub. Date: Jan. 24, 2013

(65) Prior Publication Data
US 2014/0142841 A1 May 22, 2014

(30) Foreign Application Priority Data
Jul. 15, 2011 (KR) .................. 10-2011-0070324

(51) Int. Cl.
*G01C 21/00* (2006.01)
*B63C 11/00* (2006.01)
(Continued)

(52) U.S. Cl.
CPC ............... *G01C 21/00* (2013.01); *B63B 59/08* (2013.01); *B63C 11/00* (2013.01); *B63C 11/48* (2013.01); *G01C 21/20* (2013.01); *B63J 2099/006* (2013.01); *G01C 21/165* (2013.01)

(58) Field of Classification Search
CPC ................................ G01C 21/00; B63C 11/00
USPC .................................................. 701/408, 409
See application file for complete search history.

(56) References Cited

U.S. PATENT DOCUMENTS

| 5,746,210 A | * | 5/1998 | Benaron | ............ G01N 21/4795 356/338 |
| 6,317,387 B1 | | 11/2001 | D'Amaddio et al. | |

(Continued)

FOREIGN PATENT DOCUMENTS

| JP | 63036174 A | * | 2/1988 | ............... G01S 7/52 |
| JP | 08-136240 A | | 5/1996 | |

(Continued)

OTHER PUBLICATIONS

International Search Report issued in corresponding application No. PCT/KR2012/005624 mailed Nov. 26, 2012.

*Primary Examiner* — John R Olszewski
*Assistant Examiner* — Jean-Paul Cass
(74) *Attorney, Agent, or Firm* — Carter, DeLuca, Farrell & Schmidt, LLP

(57) ABSTRACT

Provided is an apparatus for measuring a location of an underwater vehicle, including a hull information generating unit dividing a hull surface into a plurality of areas, and generating normal vector information for each area and level information which is information for a depth that each area is submerged into water, a vehicle information receiving unit receiving attitude and depth information for a vehicle attached to the hull surface, and a location determining unit comparing the attitude information for the vehicle with the normal vector information for the area, and comparing the depth information for the vehicle and the level information for the area to determine a location of the vehicle.

12 Claims, 8 Drawing Sheets

(51) Int. Cl.
*B63B 59/08* (2006.01)
*B63C 11/48* (2006.01)
*G01C 21/20* (2006.01)
*B63J 99/00* (2009.01)
*G01C 21/16* (2006.01)

(56) References Cited

U.S. PATENT DOCUMENTS

| | | | | |
|---|---|---|---|---|
| 7,036,450 | B2* | 5/2006 | Freund | B63G 8/22 114/312 |
| 7,343,261 | B1* | 3/2008 | Kell | G01K 3/00 324/160 |
| 8,125,849 | B2* | 2/2012 | Cabrera | G01F 1/663 367/87 |
| 8,417,451 | B2* | 4/2013 | Hersey | G01C 13/008 701/468 |
| 8,768,620 | B2* | 7/2014 | Miller | G01C 21/16 701/500 |
| 2003/0154900 | A1* | 8/2003 | Freund | B63G 8/22 114/330 |
| 2006/0236772 | A1* | 10/2006 | Naluai | G01H 11/00 73/649 |
| 2007/0104354 | A1* | 5/2007 | Holcomb | G01C 11/02 382/109 |
| 2007/0106462 | A1* | 5/2007 | Blain | G05D 1/10 701/518 |
| 2008/0300821 | A1* | 12/2008 | Frank | G01V 1/201 702/150 |
| 2008/0308343 | A1* | 12/2008 | Vogt | G01P 5/24 181/142 |
| 2010/0141518 | A1* | 6/2010 | Hersey | G01C 13/008 342/357.64 |
| 2012/0029810 | A1* | 2/2012 | Dai | G01C 21/20 701/489 |

FOREIGN PATENT DOCUMENTS

| | | | |
|---|---|---|---|
| JP | 2003215230 A | * | 7/2003 |
| JP | 2004-226374 A | | 8/2004 |
| JP | 2009-196456 A | | 9/2009 |
| JP | 2011-075414 A | | 4/2011 |
| JP | 2011075414 A | * | 4/2011 |
| KR | 1020080093536 A | | 10/2008 |
| KR | 1020090004192 A | | 1/2009 |
| KR | 1020100028376 A | | 3/2010 |
| KR | 1020100104581 A | | 9/2010 |

* cited by examiner

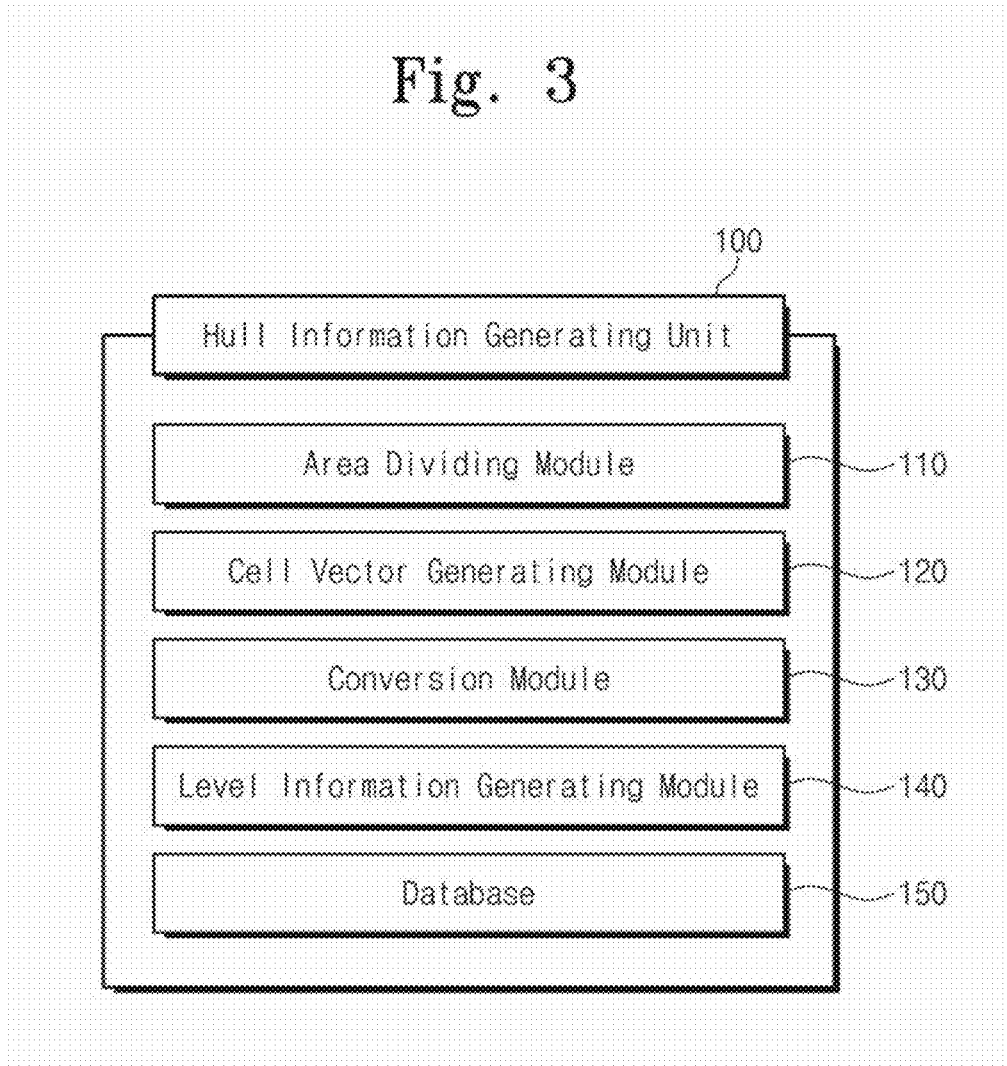

APPARATUS FOR MEASURING LOCATION OF UNDERWATER VEHICLE AND METHOD THEREOF

TECHNICAL FIELD

The present invention disclosed herein relates to an apparatus for measuring a location of an underwater vehicle and a method thereof.

BACKGROUND ART

The hull surface of a large vessel corrodes and has floating materials in the sea attached thereto. In order to re-coat the corroding hull surface or remove the attached floating materials, divers work manually in the sea. This manual work is also performed for determining normality or abnormality of the hull surface. However, it takes a lot of time to examine or repair the entire hull surface and risks are inherent all the time in that the works are performed under the sea.

Recently, various robots have been developed operable in the sea in order to examine abnormality of the hull surface or repair the abnormality of the hull surface. In particular, robots are emerged which precisely examine and repair the hull surface while being attached to and moving on the hull surface. A location of an underwater robot, which works while being attached to the bottom surface of the hull, may be found in various ways. As a representative way of finding the location of the underwater robot, there is a long baseline (LBL), short baseline (SBL), or ultra short baseline (USBL) positioning system using an ultrasonic system.

In these ways, the location of the underwater operating robot may be calculated by installing on the bottom of the hull a plurality of acoustic transceivers which transmit ultrasonic waves, detecting ultrasonic waves which are reflected in response to the transmitted ultrasonic waves, and integrating a location relationship with each of the plurality of acoustic transceivers. However, these ways take a lot of time due to various devices installed in the sea.

Another way to calculate a location of an underwater robot working on the bottom portion of the hull is to compare terrain features by using a vision system or an ultrasonic scanner. However, it is also difficult to find a precise location in this way because singularity extraction is not easy when the hull surface is clean.

Therefore, an apparatus is necessary for finding a location of an underwater robot working while being attached to the bottom portion of the hull.

DISCLOSURE

Technical Problem

The present invention provides an apparatus and method for easily and precisely finding location information for an underwater vehicle which works while being attached to the hull.

Technical Solution

Embodiments of the present invention provide apparatuses for measuring a location of an underwater vehicle, including: a hull information generating unit dividing a hull surface into a plurality of areas, and generating normal vector information for each area and level information which is information for a depth that each area is submerged into water; a vehicle information receiving unit receiving attitude and depth information for a vehicle attached to the hull surface; and a location determining unit comparing the attitude information for the vehicle with the normal vector information for the area, and comparing the depth information for the vehicle and the level information for the area to determine a location of the vehicle.

In some embodiments, the location determining unit may determine, as the location of the vehicle, an area where the attitude information for the vehicle corresponds to the normal vector information for the area, and the depth information for the vehicle corresponds to the level information for the area.

In other embodiments, the attitude information and the normal vector information may include any one or more pieces of information from among a roll value which is an angle rotated around x axis, a pitch value which is an angle rotated around y axis, and a yaw value which is an angle rotated around z axis in an earth coordinate.

In still other embodiments, the hull information generating unit may include at least any one of: an area dividing module dividing the hull surface into the plurality of areas; a cell vector generating module generating cell vector information for each area; a conversion module converting the cell vector information for each area into that in an earth coordinate to generate the normal vector information; a level information generating module extracting the level information which includes a depth that each of the areas is submerged into water; and a database storing the cell vector information and the normal vector information.

In even other embodiments, the cell vector information may include any one or more pieces of information from among a roll value which is an angle rotated around x axis, a pitch value which is an angle rotated around y axis, and a yaw value which is an angle rotated around z axis in the earth coordinate.

In yet other embodiments, the vehicle information receiving unit may include at least any one of: a vehicle attitude information receiving module receiving the attitude information for the vehicle; and a vehicle depth information receiving module receiving the depth information for the vehicle.

In further embodiments, the vehicle location determining unit may include: a depth information mapping module comparing the depth information with the level information to extract a first area where the depth information corresponds to the level information; and a vehicle location mapping module comparing the attitude information with the normal vector information to extract a second area where the attitude information corresponds to the normal vector information.

In still further embodiments, the vehicle location mapping module may compare the attitude information with the normal vector information for the first area to extract the second area where the attitude information corresponds to the normal vector information for the first area.

In other embodiments of the present invention, methods of measuring a location of an underwater vehicle, comprising: (a) dividing a hull surface into a plurality of areas, and generating normal vector information for each area and level information which is information for a depth that each area is submerged into water; (b) receiving attitude and depth information for a vehicle attached to the hull surface; and (c) comparing the attitude information for the vehicle with the normal vector information for the area, and comparing the depth information for the vehicle and the level information for the area to determine a location of the vehicle.

In some embodiments, the operations (a) and (b) may be performed in an order of operation (a) and then operation (b), or an order of operation (b) and then operation (a), or operations (a) and (b) are concurrently performed.

In other embodiments, operation (c) may include: (c-1) extracting a first area where the depth information for the vehicle corresponds to the level information for the area; and (c-2) extracting a second area where the attitude information for the vehicle corresponds to the normal vector information for the area.

In still other embodiments, operation (c-2) may include extracting the second area where the attitude information for the vehicle corresponds to the normal vector information for the first area.

In even other embodiments, operation (a) may include: generating cell vector information for each area; and converting the cell vector information for each area into that in an earth coordinate to generate the normal vector information.

Advantageous Effects

According to the embodiments of the present invention, first, location information for an underwater vehicle attached on the bottom portion of a hull can be found without installing separate external devices.

Second, a location of the vehicle on the bottom portion of the hull can be found in real time.

Third, a precise location of the vehicle on the bottom portion of the hull can be detected without singularities on the hull.

Fourth, a location of the vehicle attached to the bottom portion of the hull can be found under movement.

DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 3 is a block diagram illustrating a hull information generating unit which is a portion of a configuration of the first embodiment of the present invention;

DETAILED DESCRIPTION

Embodiments of the present invention will be embodied in different forms and should not be constructed as limited to the embodiments set forth herein. Rather, these embodiments are provided so that this disclosure will be thorough and complete, and will fully convey the scope of the present invention to those skilled in the art. It will be understood that, although the terms first, second, etc. may be used herein to distinguish one element from another element, not to be limited by the terms.

Throughout this specification, when an element is referred to as "comprise" or "include" a component, it does not preclude another component but may further comprise or include the other component unless the context clearly indicates otherwise. It is to be understood that the singular forms "a," "an," and "the" include plural referents unless the context clearly dictates otherwise.

An embodiment of the present invention pertains to an apparatus for precisely detecting a location of a vehicle which is attached to and moves on a hull surface. In an embodiment, a location of a vehicle may be detected by comparing vector information measured by a sensor included inside the vehicle and vector information according to a curve and depth of the hull surface.

Hereinafter, it will be described about an exemplary embodiment of the present invention in conjunction with the accompanying drawings.

A first embodiment of the present invention pertains to a location measuring apparatus of an underwater vehicle.

Figure 1:
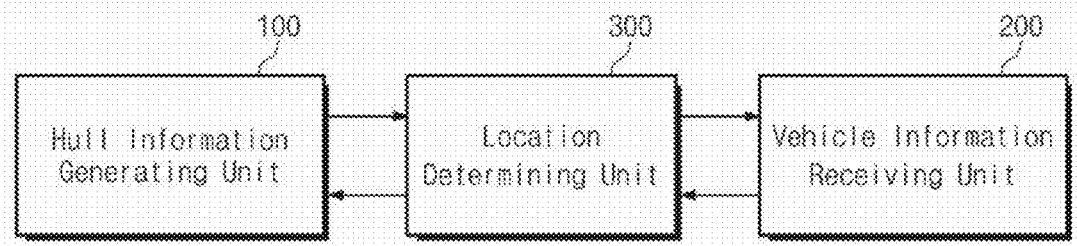
FIG. 1 is a block diagram illustrating a location measuring apparatus of an underwater vehicle according to a first embodiment of the present invention.

FIG. 1 is a block diagram illustrating a location measuring apparatus of an underwater vehicle according to the first embodiment of the present invention.

As shown in FIG. 1, the location measuring apparatus of an underwater vehicle according to the first embodiment of the present invention includes a hull information generating unit 100, a vehicle information receiving unit 200, and a location determining unit 300.

The hull information generating unit 100 generates normal vector information for each area of a hull surface and level information for a depth that the area is submerged. The hull surface is formed by precisely connecting a plurality of steel plates together and grinding joints. Planes and curved surfaces are formed on the hull surface, and a curved surface having a predetermined radius of curvature is a combination of a plurality of fine planes. There are normal vectors on the planes and curved surfaces forming the hull surface, and they are towards an outer side of a vessel and perpendicular to the planes.

In addition, for the vessel, a height of the hull exposed on the water due to buoyancy and the depth of the vessel submerged under the water may be measured, and the level information may be also obtained according to the depth that the hull is submerged in addition to the normal vector information for discriminating areas of the hull surface from each other.

In the end, identifying factors for each area of the hull surface, which are generated in the hull information generating unit 100, include the normal vector information and the level information.

Detailed description for the hull information generating unit 100 will be provided in relation to FIG. 3 later.

The vehicle information receiving unit 200 receives attitude information and depth information for the vehicle. The vehicle generates the attitude and depth information thereof by using various sensors installed therein. The attitude information of the vehicle may be generated by, for example, an inertial measurement unit (IMU) or an attitude heading reference unit (AHRS). This unit calculates roll, pitch, and yaw angles for the attitude of the vehicle. The depth information for the vehicle is generated by, for example, a pressure sensor or a depth sensor included inside the vehicle. The information generated by the sensor included inside the vehicle is the attitude information and depth information of the vehicle.

The location determining unit 300 determines, as a location of the vehicle, an area where the attitude information corresponds to the normal vector information for each area of the hull surface which are generated and measured as described above, and where the depth information corresponds to the level information for an area of the hull surface. That is, the vehicle which is attached to and moves on the hull surface corresponds to at least one of the normal vectors in a specific area of the hull surface. Furthermore, the depth information for the vehicle which is attached to the hull surface corresponds to level information for at least one specific area of the hull surface. The location determining unit 300 determines, as a location of the vehicle, by selecting a specific area where the normal vector and level information for each area of the hull surface correspond to information for the vehicle.

Figure 2:
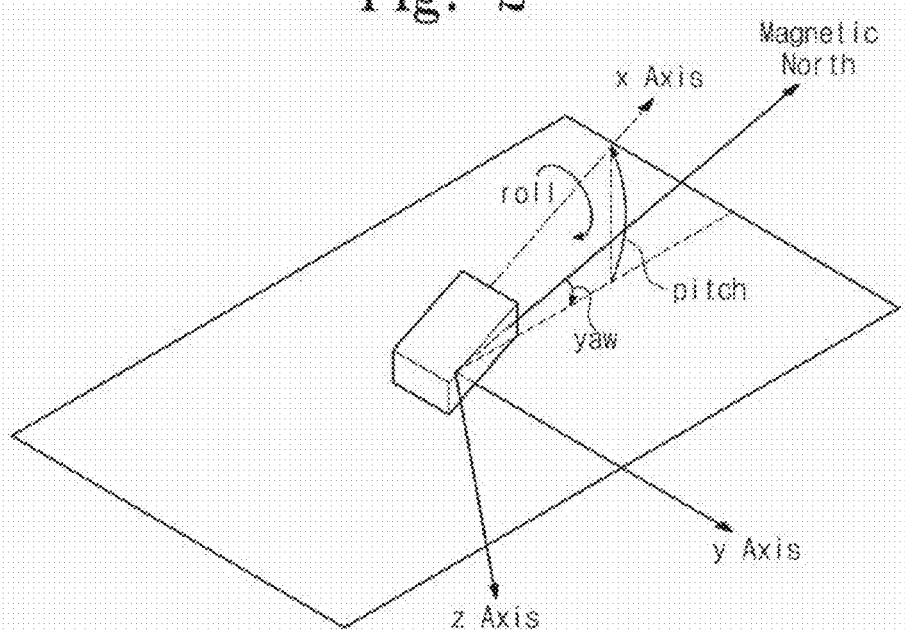
FIG. 2 is a structural diagram illustrating roll, pitch, yaw angles.

Before description about the hull information generating unit 100 which is a portion of a configuration of the first embodiment of the present invention, the normal vector information of each area of the hull surface and roll, pitch, and yaw angles which are attitude information of the vehicle are described in relation to FIG. 2.

FIG. 2 is a structural diagram for describing the roll, pitch and yaw angles.

An object has a center point. It is assumed that there are three axes penetrating through the center portion respectively in a direction forward and backward, in a horizontal direction, and in a vertical direction. Movement and attitude of the object may be interpreted by combining linear movement along the 3 axes and rotational movement around 3 axes.

As shown in FIG. 2, when an object moving along an x-axis is assumed, a pitch angle means an angle according to a rotational movement around a horizontal axis (y-axis), which occurs by means of a linear movement along an axis of a direction forward and backward (x-axis) with respect to the center point of the object. A roll angle means an angle by means of a rotational movement around the axis of the direction forward and backward (x axis) occurring along linear movement according to the horizontal axis (y axis) with respect to the center point of the object.

A yaw angle means an angle by means of rotational movement around a vertical axis (z axis) with respect to the center point of the object.

Typically, the above described normal vector information and attitude information of the vehicle may be represented by roll, pitch, and yaw angles, and the vector is a mathematical symbol represented as a magnitude and a direction. In the embodiment of the present invention, whether the normal vector information and the attitude information of the vehicle are identical is determined by a vector direction, which is represented as the roll, pitch, and yaw angles.

FIG. 3 is a block diagram illustrating the hull information generating unit 100 which is a portion of the configuration of the first embodiment of the present invention.

The hull information generating unit 100 includes an area dividing module 110 dividing the hull into areas, a cell vector generating module 120 generating vector information for the divided hull areas, a conversion module 130 converting the vector information for each area of the hull into that in an earth coordinate to generate the normal vector information, a level information generating module 140, and a database 150 storing drawing information for the vessel and the normal vector information in the earth coordinate.

The area dividing module 110 reads the drawing information for the vessel stored in the database 150. In particular, drawing of the hull surface of the vessel is read from among the drawing information for the vessel.

Figure 4A:
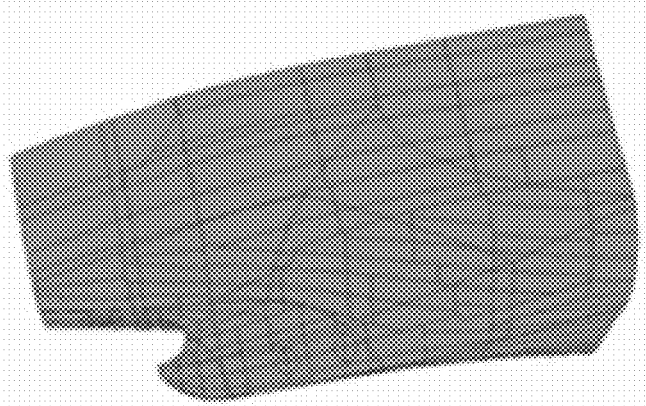
FIG. 4A illustrates an exemplary diagram of a hull surface.

FIG. 4A is an exemplary diagram of the hull surface.

As shown in FIG. 4A, in order to divide the hull surface into areas, a drawing for a connection state of a plurality of steel plates is used, which is used for completing the hull surface. The hull surface is divided into areas where cell vector information (a vector perpendicular to each area surface) for each sector differs from each other by means of triangulation or a finite element method.

Figure 4B:
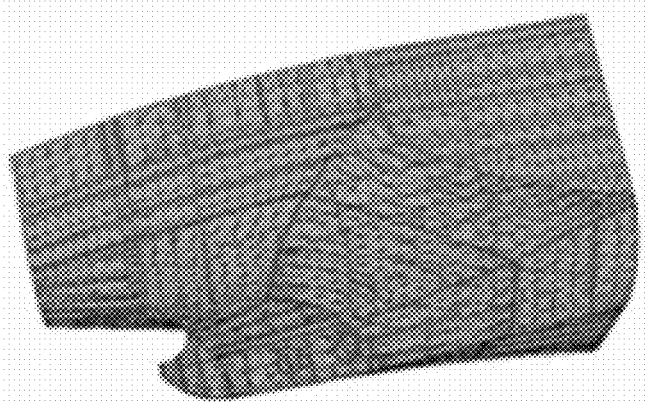
FIG. 4B illustrates areas of the hull surface divided by a triangulation method.

FIG. 4B illustrates the hull surface areas divided by the triangulation.

As shown in FIG. 4B, each area of the hull surface is specified. The each specified area of the hull surface has a unique value for the cell vector information.

Each area is specified by roll, pitch, yaw values, which are the cell vector information, and areas having the same roll, pitch, and yaw values may exist in plural.

In such a way, the area dividing module 110 divides the hull surface into each area by using the hull drawing.

The vector generating module 120 generates the cell vector information for the divided hull areas. In order to generate the cell vector information for each sector of the hull surface, an arbitrary point is set to be a reference in the vessel.

Figure 5:
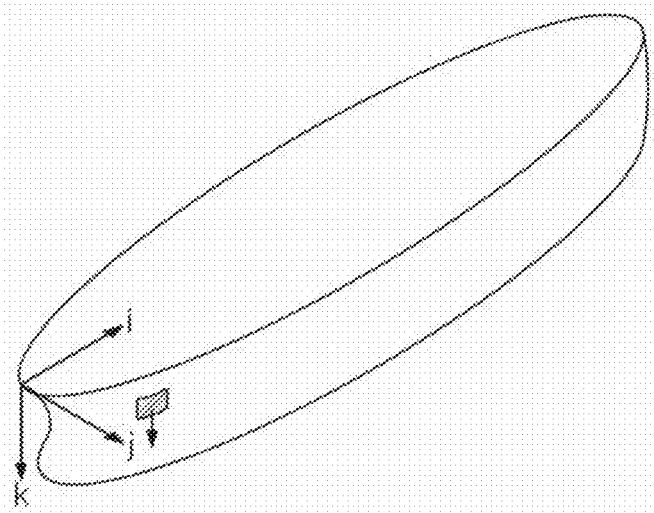
FIG. 5 is a conceptual diagram illustrating a method of generating cell vector information for the hull surface areas.

FIG. 5 is a conceptual diagram for describing a method of generating the cell vector information for each area of the hull surface.

As shown in FIG. 5, a coordinate (i, j, k) is set around an arbitrary point at the bow or the stern. Roll, pitch, and yaw values of a protruding vector from an area (a shaded area) drawn on the basis of the set coordinate are geometrically calculated.

The vector generating module 120 generates all cell vector information for each area shown in FIG. 4B.

The conversion module 130 performs conversion on the cell vector information for each area of the hull surface on the basis of the earth coordinate to generate normal vector information.

The reason why the cell vector information is converted into the normal vector information on the basis of the earth coordinate is that a sensor for generating attitude information included inside the vehicle generates roll, pitch, and yaw values on the basis of the earth coordinate. In addition, the earth coordinate allows the roll, pitch, and yaw values to be constant without accompanying a coordinate change by enabling a specific point fixed to the magnetic north to be set despite of movement of the hull as well as movement of the vehicle.

Figure 6:
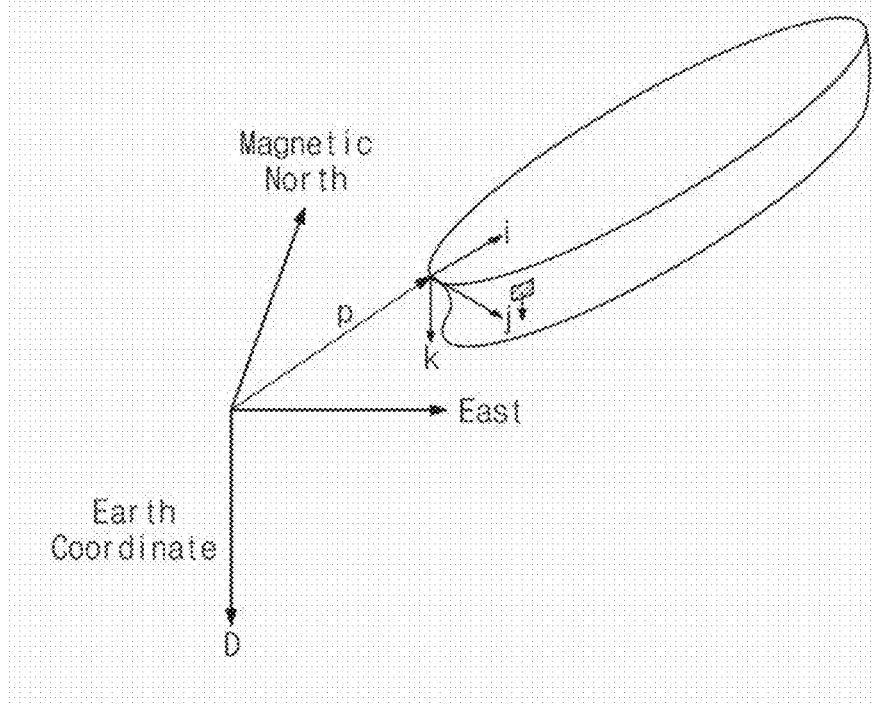
FIG. 6 is a conceptual diagram illustrating a method of converting the cell vector information on the basis of an earth coordinate system.

FIG. 6 is a conceptual diagram for explaining a method of converting cell vector information on the basis of the earth coordinate.

The cell vector information generated in the above mentioned cell vector generating module 120 uses one coordinate that an arbitrary point on the hull is taken as an original point. The cell vector information means roll, pitch, and yaw values. When the cell vector information is converted into that in the earth coordinate, an original point of the one coordinate is translated in parallel to correspond to the original point of the earth coordinate, and then the roll, pitch, and yaw values are converted. That is, the roll, pitch, and yaw values are converted into those on the basis of axes of the earth coordinate in which the original point corresponds to the original point of the one coordinate, which is translated in parallel by a distance which is away from the original point of the earth coordinate as shown in FIG. 6.

The level information generating module 140 extracts depth information for each divided hull area. Submerged depths are measured in deep water that areas of the hull surface divided by the area dividing module 110 are submerged. The level information that is the measured depth information for each area becomes a comparison factor for calculating a position of the vehicle.

The database 150 included in the hull information generating unit 100 stores information for the vessel drawing and the cell vector information. The information for the vessel drawing is used by the area dividing module 110 for dividing areas shown in FIG. 4B in the hull surface drawing of FIG. 4A. Furthermore, the cell vector information for the vessel is constant despite of movement of the vessel by using a coordinate having an original point thereof inside the vessel. The cell vector information stored in the database 150 is converted by the conversion module 130 on the basis of the earth coordinate to be used for calculating a location of the vehicle regardless of docking or a moving position of the vessel.

In the above, the hull information generating unit 100, which is a portion of the configuration of the first embodiment of the present invention, is described. Hereinafter, the vehicle information receiving unit 200 is described in relation to FIG. 7, which receives location information for the vehicle in the location measuring apparatus of an underwater vehicle according to the first embodiment of the present invention.

Figure 7:
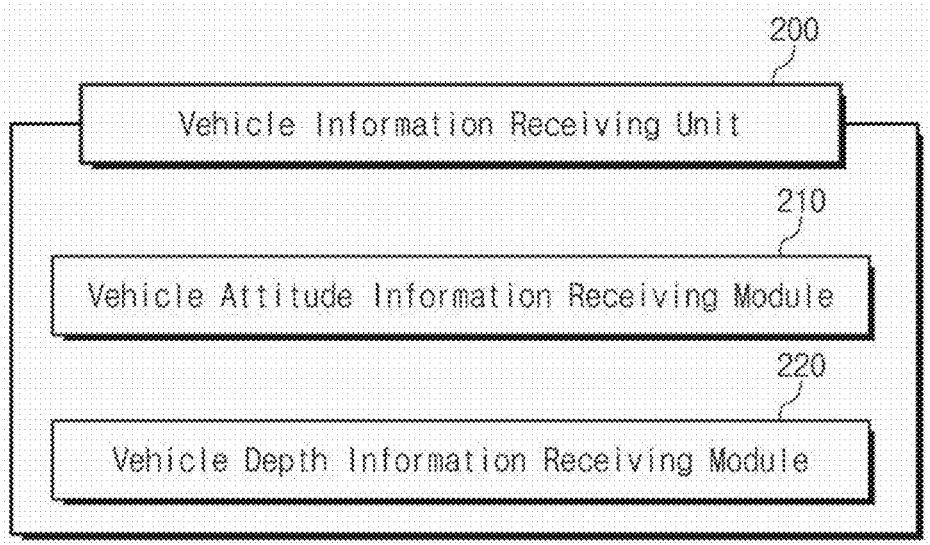
FIG. 7 is a block diagram illustrating a vehicle information receiving unit which is a portion of the configuration of the first embodiment of the present invention.

FIG. 7 is a block diagram illustrating the vehicle information receiving unit 200, which is a portion of the configuration of the first embodiment of the present invention.

As shown in FIG. 7, the vehicle information receiving unit 200 includes a vehicle attitude information receiving module 210 and a vehicle depth information receiving module 220.

The vehicle attitude information receiving module 210 generates attitude information for the vehicle by using an IMU or an AHRS included in the vehicle. The IMU or AHRS included in the vehicle calculates roll, pitch, and yaw values of the vehicle on the basis of the magnetic north of the earth coordinate as shown in FIG. 2. The IMU is a sensor measuring acceleration and rotational movement and measures and records a speed, a direction, and a gravity of the vehicle. Moreover, the IMU analyzes a location of the vehicle. The AHRS is a device measuring an attitude or azimuth of the vehicle, and may include an acceleration sensor, a gyro sensor, or a magnetic sensor.

The attitude information receiving module 210 receives attitude information generated by the IMU or the AHRS included in the vehicle.

The vehicle depth information receiving module 220 receives depth information of the vehicle sensed by a depth sensor included in the vehicle. The vehicle moving along the hull surface includes therein a sensor, such as a depth sensor or a pressure sensor, capable of measuring a depth of water as well as IMU or AHRS. Depth information which is information on a depth of the vehicle is generated by the depth sensor or the pressure sensor included in the vehicle. The vehicle depth information receiving module 220 receives the depth information generated by the vehicle.

In the above, the vehicle information receiving unit 200, which is a portion of the configuration according to the first embodiment of the present invention, is described. Hereinafter, a location determining unit 300 included in the location measuring unit of an underwater vehicle according to the first embodiment of the present invention is described in relation to FIG. 8.

Figure 8:
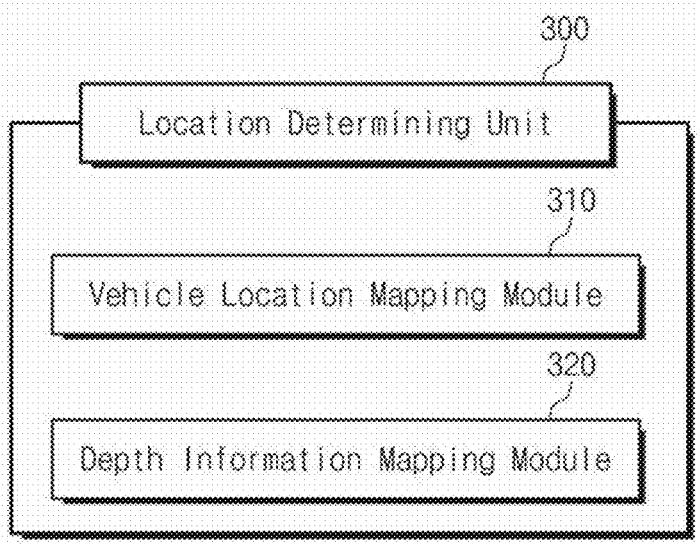
FIG. 8 is a block diagram illustrating a location determining unit which is a portion of the configuration of the first embodiment of the present invention.

FIG. 8 is a block diagram illustrating a location determining unit 300, which is a portion of the configuration according to the first embodiment of the present invention.

The location determining unit 300 compares the attitude information of the vehicle with the normal vector information of hull surface areas, and the depth information of the vehicle with the level information of the hull surface areas, and determines, as a location of the vehicle, a specific area of the hull surface where the compared results respectively show correspondence.

As shown in FIG. 8, the locating determining unit 300 includes a vehicle location mapping module 310 and a depth information mapping module 320.

The vehicle location mapping module 310 compares the attitude information received from the attitude information receiving module 210 of the vehicle information receiving unit 200 with the normal vector information converted by the conversion module of the hull information generating unit and extracts a first area group of the hull surface where the compared result shows correspondence.

The depth information mapping module 320 compares the vehicle depth information received from the vehicle depth information receiving module 220 of the vehicle information receiving unit with the level information received from the level information generating module 140 of the hull information generating unit 100 and extracts a second area group of the hull surface wherein the compared result shows correspondence.

Then, a specific area exists where the first area group and the second area group overlap and it is possible to infer that the vehicle is currently attached to the specific area of the hull surface. Accordingly, the location of the vehicle is precisely calculated on the hull surface.

Hereinafter, a location measuring apparatus of an underwater vehicle according to a second embodiment of the present invention is described.

In the first embodiment of the present invention, the cell vector information for all areas of the hull surface is converted into the normal vector information. However, only cell vector information for some areas of the hull surface where the level information for the hull surface corresponds to the depth information of the vehicle is converted into normal vector information in the second embodiment of the present invention.

Description about the overlapping configuration with that of the first embodiment is omitted.

Figure 9:
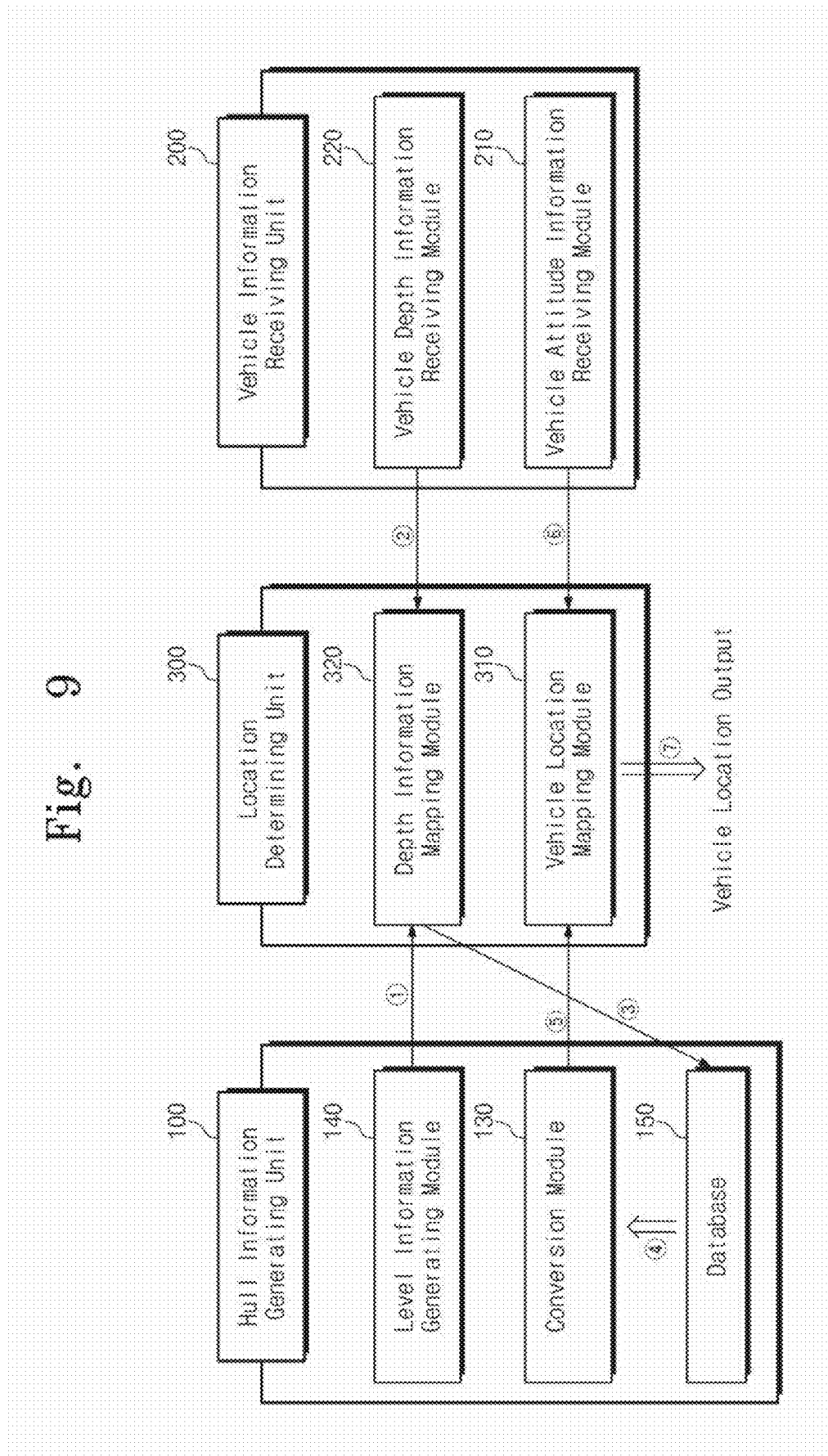
FIG. 9 is a connection relationship block diagram of a location measuring apparatus of an underwater vehicle according to a second embodiment of the present invention.

FIG. 9 is a connection relationship block diagram of the locating measuring apparatus of an underwater vehicle according to the second embodiment of the present invention. As shown in FIG. 9, in the second embodiment of the present invention, the depth information mapping module 320 of the location determining unit monitors in real time ① the level information generated by the level information generating module 140 and ② vehicle depth information generated by the vehicle depth information receiving module 220. At this time, a hull surface area is extracted which has level information corresponding to the depth information of the vehicle. ③ The extracted area information is transmitted to the database 150, and ④ cell vector information for the extracted area is transmitted from the database 150 to the conversion module 130. ⑤ The conversion module 130 converts the cell vector information into normal vector information and transmits the normal vector information to the vehicle location mapping module 310. ⑥ Moreover, the vehicle attitude information receiving module 210 transmits the attitude information received from the vehicle to the vehicle location mapping module 310. ⑦ A hull surface area where received normal vector information corresponds to received attitude information is specified and output as the location of the vehicle, wherein the normal vector is received through a process of converting, by the conversion module 310, the cell vector information into the normal vector information and transmitting the normal vector information to the vehicle location mapping module 310 and a process of transmitting, by the vehicle attitude information receiving module 210, attitude information received from the vehicle to the vehicle location mapping module 310.

In the second embodiment of the present invention, the cell vector information is converted into the normal vector information only for areas where depths correspond to each other. Cell vector information is attempted to be converted into normal vector information not for all areas divided on the hull surface, but only for some areas where depth information corresponds to each other and a location of the vehicle is calculated. Since conversion is performed only for the some areas, a data calculation speed is enhanced and a time taken to calculate the location of the vehicle becomes reduced.

Hereinafter, a method of measuring a location of an underwater vehicle according to a third embodiment of the present invention is described.

The first and second embodiments of the present invention pertain to the location measuring apparatus for an underwater vehicle, and the third embodiment of the present invention pertains to the method of measuring a location of an underwater vehicle by which a location of the underwater vehicle is measured until a specific area where information for each area of the hull surface corresponds to information for the vehicle is found.

Description about overlapping configuration with those of the first and second embodiments is omitted.

Figure 10:
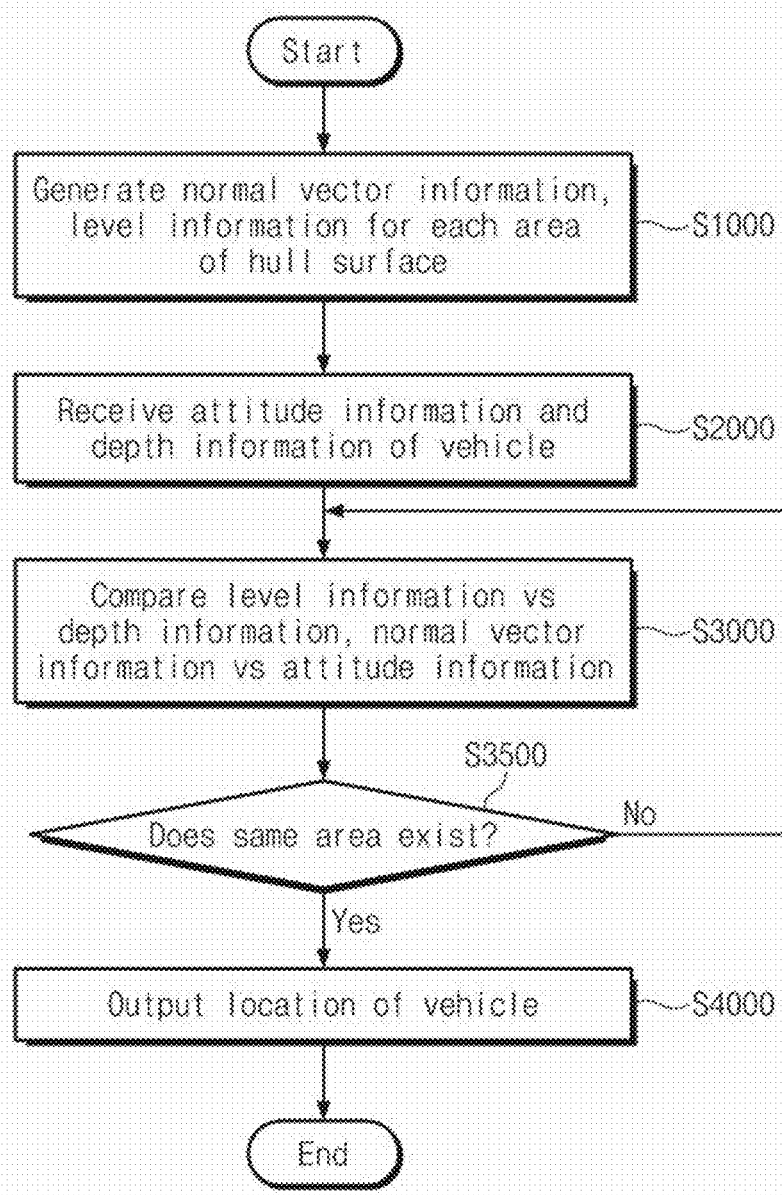
FIG. 10 is a flowchart illustrating a method of measuring a location of an underwater vehicle according to a third embodiment of the present invention.

FIG. 10 is a flowchart illustrating the method of measuring a location of an underwater vehicle according to the third embodiment of the present invention.

The method of measuring a location of an underwater vehicle according to the third embodiment of the present invention includes an operation (S1000) of generating normal vector information for each area of a hull surface and level information, which is data with respect to a submerged depth in water, an operation (S2000) of receiving attitude information and depth information for the vehicle, an operation (S3000) of comparing normal vector information for each area of the hull surface with the attitude information of the vehicle, and the level information for each area with the depth information for the vehicle, and an operation (S4000) of extracting an area of the hull surface where the compared results show correspondence. In particular, the operation of generating the normal vector information for each area of the hull surface includes an operation of dividing portions of the hull having different pieces of cell vector information into each area, and generating the normal vector information on the basis of an earth coordinate in the divided areas. The cell vector information means roll, pitch, and yaw values of a vector which is perpendicular to each area of the hull surface on the basis of a coordinate set on the basis of an arbitrary point on the hull. The cell vector information is a unique value of each area of the hull surface, which is not changed by a location change or movement of the vessel as long as the hull surface of the vessel is not changed. The cell vector information is changed into normal vector information, the normal vector information is compared with attitude information of the vehicle, and a location of the vehicle is calculated.

When, in operation S3000, there is not any area where the comparisons of the level information vs depth information, and normal vector information vs attitude information show correspondence, operation S1000 is performed again.

Operation S1000 of generating normal vector information for each area of a hull surface and level information, which is data with respect to a submerged depth in water, and operation S2000 of receiving attitude information and depth information for the vehicle may be changed in an order of performance or concurrently performed.

Figure 11:
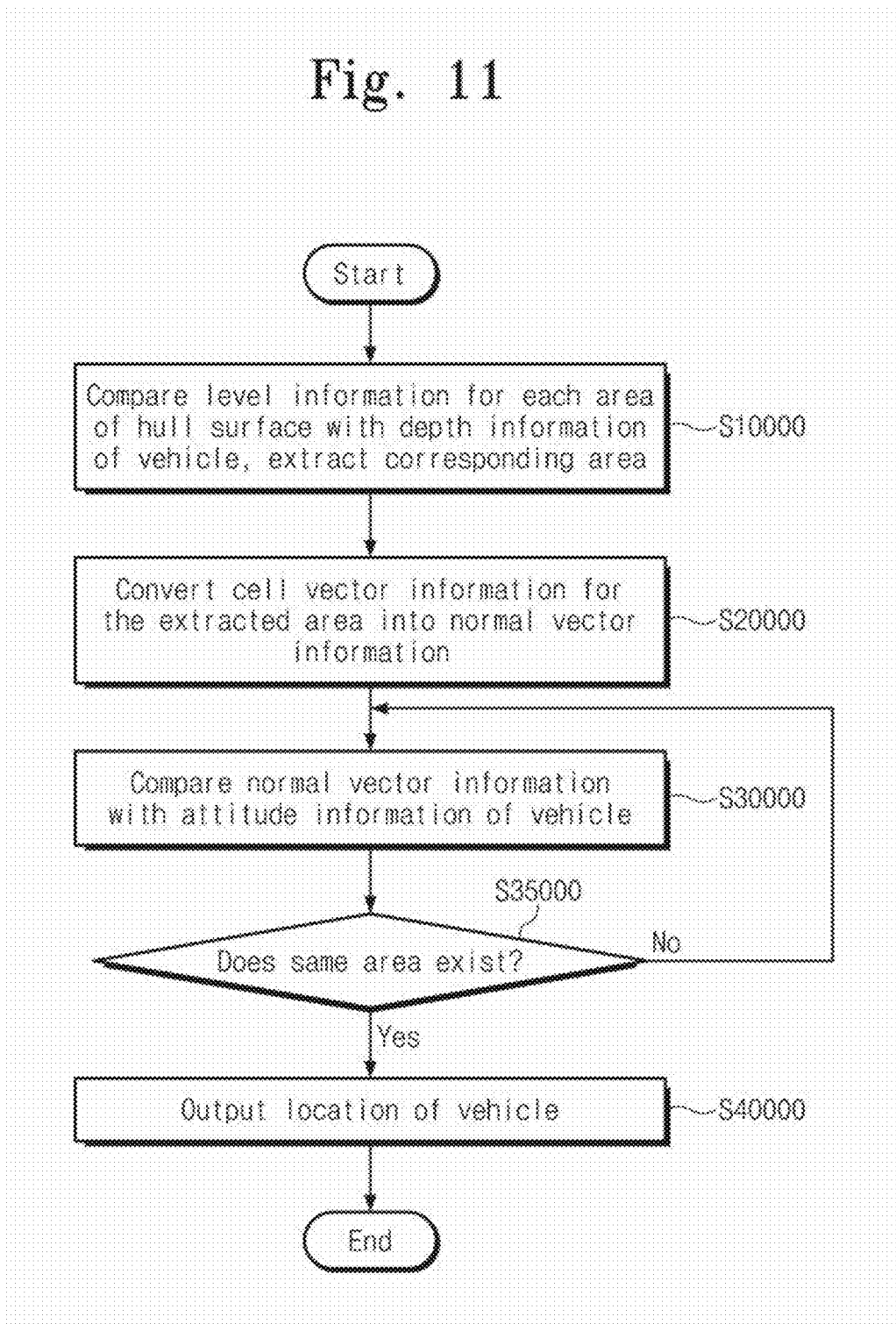
FIG. 11 is a flowchart illustrating a method of measuring a location of an underwater vehicle according to a fourth embodiment of the present invention.

FIG. 11 is a flowchart of a method of measuring a location of an underwater vehicle according to a fourth embodiment of the present invention.

In the third embodiment of the present invention, the cell vector information is converted into the normal vector information for all the areas on the hull surface. In contrast, in the fourth embodiment of the present invention, conversion of the cell vector information into the normal vector information is performed only for some areas of the hull surface where the level information for the hull surface corresponds to the depth information of the vehicle, and a location of the underwater vehicle is measured until a specific area where the information for each area of the hull surface corresponds to information for the vehicle is found.

Description about the overlapping configurations with those of the first to third embodiments is omitted.

The method of measuring a location of the underwater vehicle according to the fourth embodiment of the present invention includes an operation (S10000) of comparing level information for each area of the hull surface with depth information for the vehicle and extracting an area where the compared result shows correspondence, an operation (S20000) of converting cell vector information for the extracted area into normal vector information, an operation (S30000) of comparing the normal vector information with attitude information for the vehicle, and an operation (S40000) of determining a location of the vehicle according to the compared result. In the fourth embodiment of the present invention, cell vector information for all the areas of the hull surface is not necessary to be converted into normal vector information, but cell vector information only for some areas where level information, which is a depth that the hull surface is submerged in water, corresponds to the depth information of the vehicle is converted into normal vector information.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. An apparatus for measuring a location of an underwater vehicle directly attached on a hull surface of a vessel to examine the hull surface, comprising:
   a hull information generating unit dividing the hull surface of the vessel into a plurality of surfaces, and generating normal vector information of each surface, including a normal vector perpendicular to each surface, and level information which is information for a depth that each surface is submerged into water, the hull information generating unit comprising a database storing the normal vector information of each surface and a level information generating module extracting the level information of each surface;

sensors for generating attitude information and depth information of the underwater vehicle directly attached on the hull surface;

a vehicle information receiving unit receiving the attitude information and the depth information of the underwater vehicle from the sensors; and a location determining unit accessing the database, comparing the attitude information of the underwater vehicle with the normal vector information of the plurality of surfaces stored in the database, and comparing the depth information of the underwater vehicle with the level information of the plurality of surfaces to determine a location of the underwater vehicle, the location determining unit selecting a surface among the plurality of surfaces of the vessel where the attitude information of the underwater vehicle corresponds to the normal vector information of the surface of the vessel, and the depth information of the underwater vehicle corresponds to the level information of the surface of the vessel to determine the location of the underwater vehicle on the hull surface.

2. The apparatus of claim 1, wherein the attitude information and the normal vector information comprises any one or more pieces of information from among a roll value which is an angle rotated around x axis, a pitch value which is an angle rotated around y axis, and a yaw value which is an angle rotated around z axis in an earth coordinate.

3. The apparatus of claim 1, wherein the hull information generating unit further comprises at least any one of:

an area dividing module dividing the hull surface into the plurality of surfaces;

a cell vector generating module generating cell vector information of each surface; and a conversion module converting the cell vector information of each surface into that in an earth coordinate to generate the normal vector information.

4. The apparatus of claim 3, wherein the cell vector information comprises any one or more pieces of information from among a roll value which is an angle rotated around x axis, a pitch value which is an angle rotated around y axis, and a yaw value which is an angle rotated around z axis in the earth coordinate.

5. The apparatus of claim 1, wherein the vehicle information receiving unit comprises at least any one of:

a vehicle attitude information receiving module receiving the attitude information of the underwater vehicle; and a vehicle depth information receiving module receiving the depth information of the underwater vehicle.

6. The apparatus of claim 1, wherein the location determining unit comprises:

a depth information mapping module comparing the depth information with the level information to extract a first surface where the depth information corresponds to the level information; and a vehicle location mapping module comparing the attitude information with the normal vector information to extract a second surface where the attitude information corresponds to the normal vector information.

7. The apparatus of claim 6, wherein the vehicle location mapping module compares the attitude information with the normal vector information of the first surface to extract the second surface where the attitude information corresponds to the normal vector information of the first surface.

8. A method of measuring a location of an underwater vehicle directly attached on a hull surface of a vessel to examine the hull surface, comprising:

(a) dividing the hull surface of the vessel into a plurality of surfaces, generating normal vector information of each surface perpendicular to a plane of each surface and level information which is information for a depth that each surface area is submerged into water, and storing the normal vector information of each surface to a database;

(b) generating attitude information and depth information of the underwater vehicle directly attached on the hull surface using sensors;

(c) receiving the attitude information and the depth information of the underwater vehicle from the sensors; and (d) accessing the database, comparing the attitude information of the underwater vehicle with the normal vector information of the plurality of surfaces stored in the database, comparing the depth information of the underwater vehicle with the level information of the plurality of surfaces to determine a location of the underwater vehicle, and selecting a surface among the plurality of surface of the vessel where the attitude information of the underwater vehicle corresponds to the normal vector information of the surface of the vessel, and the depth information of the underwater vehicle corresponds to the level information of the surface of the vessel to determine the location of the underwater vehicle on the hull surface.

9. The method of claim 8, wherein operations (a) and (c) are performed in an order of operation (a) and then operation (c), or an order of operation (c) and then operation (a), or operations (a) and (c) are concurrently performed.

10. The method of claim 8, wherein operation (d) comprises:

(d-1) extracting a first surface where the depth information of the underwater vehicle corresponds to the level information of the surface; and (d-2) extracting a second surface where the attitude information of the underwater vehicle corresponds to the normal vector information of the surface.

11. The method of claim 10, wherein operation (d-2) comprises extracting the second surface where the attitude information of the underwater vehicle corresponds to the normal vector information of the first surface.

12. The method of claim 8, wherein operation (a) comprises:

generating cell vector information of each surface; and converting the cell vector information of each surface into that in an earth coordinate to generate the normal vector information.

* * * * *